United States Patent
Ukaji et al.

(10) Patent No.: US 6,804,468 B1
(45) Date of Patent: Oct. 12, 2004

(54) WDM OPTICAL TRANSMISSION SYSTEM

(75) Inventors: Hiroshi Ukaji, Sowa-Machi (JP);
Fumito Kuramochi, Sowa-Machi (JP);
Toshihiiko Takano, Tokyo (JP);
Kuniaki Jinnai, Tokyo (JP)

(73) Assignee: Hirakawa Hewtech Corporation Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/567,214

(22) Filed: May 9, 2000

(30) Foreign Application Priority Data

May 10, 1999 (JP) .......................................... 11-129173

(51) Int. Cl.[7] ........................ H04B 10/02; H04B 10/16; H04B 10/00
(52) U.S. Cl. ...................................... 398/175; 398/155
(58) Field of Search ................................ 359/158, 124, 359/176; 375/355, 371; 398/175, 155, 154

(56) References Cited

U.S. PATENT DOCUMENTS

| | | | |
|---|---|---|---|
| 4,993,048 A | | 2/1991 | Williams et al. ............... 375/97 |
| 5,631,757 A | * | 5/1997 | Bodeep et al. ............... 398/138 |
| 5,773,345 A | | 6/1998 | Ota ............................. 438/286 |
| 5,784,184 A | | 7/1998 | Alexander et al. .......... 359/125 |
| 5,838,475 A | * | 11/1998 | Takeyari et al. ............. 398/175 |
| 6,041,066 A | * | 3/2000 | Meki et al. .................. 370/512 |
| 6,178,212 B1 | * | 1/2001 | Akashi ........................ 375/355 |
| 6,252,692 B1 | * | 6/2001 | Roberts ....................... 359/173 |
| 6,373,608 B1 | * | 4/2002 | Desurvire et al. ........... 359/158 |

OTHER PUBLICATIONS

M. Ushirozawa et al., "Bit–rate–Independent SDH/SONET Regenerator for Optical Network", ECOC 97, IEE, Sep. 1997.*

M. Ushirozawa et al. "Bit–rate–Independent SDH/SONET Regenerator for Optical Network" ECOC 97, pp. 25–28, Sep. 1997, Conference Publication No. 448, IEE, 1997.

* cited by examiner

Primary Examiner—Jason Chan
Assistant Examiner—Shi K. Li
(74) Attorney, Agent, or Firm—Antonelli, Terry, Stout & Kraus, LLP

(57) ABSTRACT

A WDM optical transmission system in which a retiming unit disposed at the front stage of the optical signal supplying unit of an optical transceiver is provided. The pulse width distortion of an optical signal generated in optical transmission through an optical fiber between two WDM optical transmission apparatus is corrected by the retiming unit after the optical signal has been demultiplexed and converted into an electrical signal.

7 Claims, 3 Drawing Sheets

1, 2, WDM OPTICAL TRANSMISSION APPARATUS
3, 3', 4, 4' OPTICAL TRANSMISSION APPARATUS
3-1, 3'-1, 4-1, 4'-1, 7, 10, 11, 14 ELECTRICAL TO OPTICAL CONVERTER
3-2, 3'-2, 4-2, 4'-2, 8, 9, 12, 13 OPTICAL TO ELECTRICAL CONVERTER
5, 6 OPTICAL TRANSCEIVER
5-1, 6-1 OPTICAL SIGNAL RECEIVING UNIT
5-2, 6-2 OPTICAL SIGNAL SUPPLYING UNIT
15, 16 OPTICAL MULTIPLEXER & DEMULTIPLEXER
17 TRANSFER RATE DETECTER
18 RETIMING UNIT
20 OPTICAL FIBER 1, 2 WDM OPTICAL TRANSMISSION APPARATUS
3, 3', 4, 4' OPTICAL TRANSMISSION APPARATUS
3-1, 3'-1, 4-1, 4'-1, 7, 10, 11, 14 ELECTRICAL TO OPTICAL CONVERTER
3-2, 3'-2, 4-2, 4'-2, 8, 9, 12, 13 OPTICAL TO ELECTRICAL CONVERTER
5, 6 OPTICAL TRANSCEIVER
5-1, 6-1 OPTICAL SIGNAL RECEIVING UNIT
5-2, 6-2 OPTICAL SIGNAL SUPPLYING UNIT
5-3, 6-3 RETIMING UNIT
15, 16 OPTICAL MULTIPLEXER & DEMULTIPLEXER
20 OPTICAL FIBER

WDM OPTICAL TRANSMISSION SYSTEM

FIELD OF THE INVENTION

The invention relates to a WDM optical transmission system, and more particularly, to a WDM optical transmission system in which jitter compression is realized and an optical transceiver is commonly used in different transfer rates and different coding formats.

BACKGROUND OF THE INVENTION

FIG. 1 shows a conventional WDM (Wavelength Division Multiplexing) optical transmission system. In this conventional WDM optical transmission system, the reference numerals 1 and 2 indicate WDM optical transmission apparatus, 3, 4, 3' and 4' indicate optional optical transmission apparatus, 5 and 6 indicate optical transceivers, 7 indicates an electrical to optical converter for wavelength $\lambda 1$, 8 indicates an optical to electrical converter for wavelength $\lambda 2$, 9 indicates an optical to electrical converter for wavelength $\lambda 1$, 10 indicates an electrical to optical converter for wavelength $\lambda 2$, 11 indicates an electrical to optical converter for wavelength $\lambda 3$, 12 indicates an optical to electrical converter for wavelength $\lambda 4$, 13 indicates an optical to electrical converter for wavelength $\lambda 3$, 14 indicates an electrical to optical converter for wavelength $\lambda 4$, 15 and 16 indicate optical multiplexers/demultiplexers.

The optical transceivers 5 and 6 include optical signal receiving units 5-1 and 6-1, optical signal supplying units 5-2 and 6-2, and retiming units 5-3 and 6-3, respectively, while the optical transmission apparatus 3, 4, 3' and 4' include electrical to optical converters 3-1, 4-1, 3'-1 and 4'-1 and optical to electrical converters 3-2, 4-2, 3'-2 and 4'-2, respectively.

In this WDM optical transmission system, an optical signal of wavelength $\lambda 1$ sent from the electrical to optical converter 3-1 of the optical transmission apparatus 3 is received by the optical signal receiving unit 5-1 of the optical transceiver 5 of the WDM optical transmission apparatus 1. The optical signal is converted into an electrical signal by the optical signal receiving unit 5-1 and outputted to the retiming unit 5-3, by which the pulse width distortion generated between the optical transmission apparatus 3 and the WDM optical transmission apparatus 1 is corrected to effect jitter compression.

The electrical signal outputted from the retiming unit 5-3 is converted by the electrical to optical converter 7 into an optical signal of wavelength $\lambda 1$ and inputted to the optical multiplexers/demultiplexers 15. The optical signal is multiplexed with another optical signal of wavelength $\lambda 3$ outputted from the electrical to optical converter 11 to generate a WDM signal which is transmitted via an optical fiber 20 to the WDM optical transmission apparatus 2.

In this WDM optical transmission apparatus 2, the WDM signal inputted is demultiplexed by the optical multiplexers/demultiplexers 16 into optical signals of wavelength $\lambda 1$ and wavelength $\lambda 3$. The optical signal of wavelength $\lambda 1$ is converted into an electrical signal by the optical to electrical converter 9 and inputted to the optical transceiver 5. The electrical signal inputted to the optical transceiver 5 is converted into an optical signal by the optical signal supplying unit 5-2 and supplied to the optical transmission apparatus 3', where the optical signal of wavelength $\lambda 1$ is converted into an electrical signal by the optical to electrical converter 3'-2.

Thus, communication from the optical transmission apparatus 3 to the optical transmission apparatus 3' is performed. Communication from the optical transmission apparatus 3' to the optical transmission apparatus 3 using an optical signal of wavelength $\lambda 2$, communication from the optical transmission apparatus 4 to the optical transmission apparatus 4' using an optical signal of wavelength $\lambda 3$, and communication from the optical transmission apparatus 4' to the optical transmission apparatus 4 using an optical signal of wavelength $\lambda 4$ are conducted in the same way.

In this WDM optical transmission system, optical transceivers 5 and 6 use a transfer rate and a coding format which are the same as those of the optical transmission apparatus 3, 4, 3' and 4'. and the clocks are sampled in the retiming units 5-3 and 6-3 from the electrical signals generated by optical to electrical conversion, and the clocks are phase-synchronized with use of PLL (Phase Locked Loop) or narrow band filter, so that the pulse width distortion is corrected to effect jitter compression.

In the conventional WDM optical transmission system, however, there is a disadvantage in that the jitter generated in optical transmission between the WDM optical transmission apparatus 1 and 2 is transmitted without being corrected and is increased to deteriorate the quality of transmission signals, although jitter generated in optical transmission via the optical transceivers 5 and 6 among the optical transmission apparatus 3, 4, 3' and 4' and may be compressed. Also, since the optical transceivers use the same transfer rate and coding format, respectively, as that used in each individual optical transmission apparatus, types of transceivers required increase.

SUMMARY OF THE INVENTION

Accordingly, it is an object of the invention to provide a WDM optical transmission system in which pulse width distortion generated in optical transmission between two WDM optical transmission apparatus is corrected so that jitter between them is compressed.

It is another object of this invention to provide a WDM optical transmission system comprising an optical transceiver which is used in common to various optical transmission apparatus having different transfer rates and coding formats.

According to the invention, a WDM optical transmission system performing communication in accordance with transmission and receipt of an optical wavelength division multiplexed (WDM) signal obtained by multiplexing optical signals of plural wavelengths having same or different transfer rates and coding formats, comprises:

a demultiplexer for demultiplexing a WDM signal to output the optical signals of plural wavelengths, an optical to electrical converter for converting at least one of the optical signals of plural wavelengths into an electrical signal, a retiming unit for correcting pulse width distortion of the electrical signal, and an optical signal supplying unit for converting the electrical signal of which distortion of pulse width has been corrected into an optical signal to be outputted to an optical signal transmission medium.

BRIEF DESCRIPTION OF THE DRAWINGS

The invention will be explained in more detail in conjunction with the appended drawings, wherein.

DETAILED DESCRIPTION OF THE PREFERRED EMBODIMENTS

Figure 2:
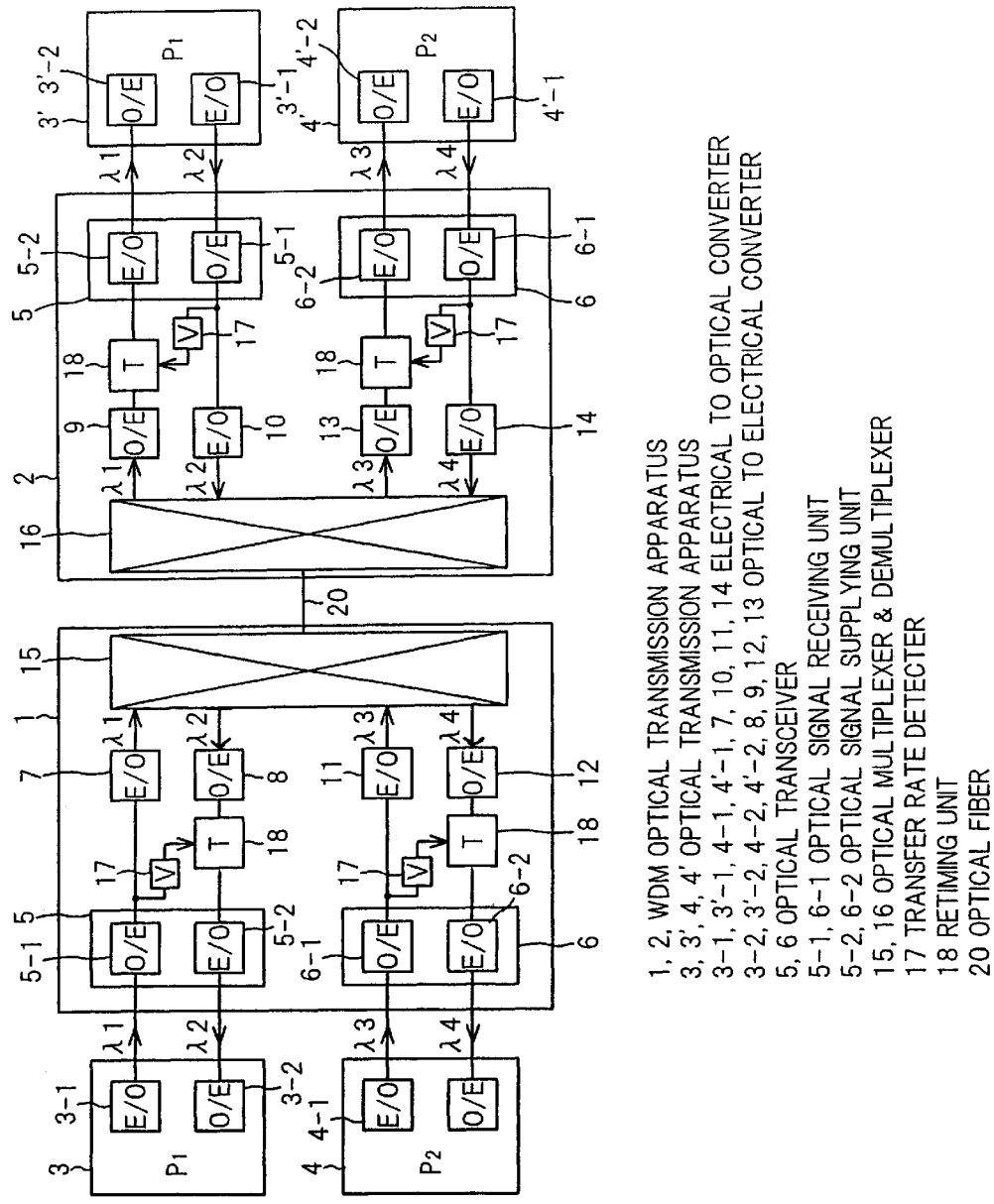
FIG. 2 is a block diagram showing a WDM optical transmission system in a first preferred embodiment according to the invention.

FIG. 2 shows a WDM optical transmission system in a first preferred embodiment according to the invention. In this WDM optical transmission system, the reference numerals 1 and 2 indicate WDM optical transmission apparatus, 3, 4, 3' and 4' indicate any optical transmission apparatus, 5 and 6 indicate optical transceivers, 7 indicates an electrical to optical converter for wavelength λ1, 8 indicates an optical to electrical converter for wavelength λ2, 9 indicates an optical to electrical converter for wavelength λ1, 10 indicates an electrical optical converter for wavelength λ2, 11 indicates an electrical to optical converter for wavelength λ3, 12 indicates an optical to electrical converter for wavelength λ4, 13 indicates an optical to electrical converter for wavelength λ3, 14 indicates an electrical to optical converter for wavelength λ4, 15 and 16 indicate optical multiplexers/demultiplexers, 17 indicates transfer rate detectors, and 18 indicates retiming units. The optical transmission apparatus 3, 4, 3' and 4' include electrical to optical converters 3-1, 4-1, 3'-1 and 4'-1 and optical to electrical converters 3-2, 4-2, 3'-2 and 4'-2, respectively, while the optical transceivers 5 and 6 include optical signal receiving units 5-1 and 6-1 and optical signal supplying units 5-2 and 6-2, respectively.

Figure 1:
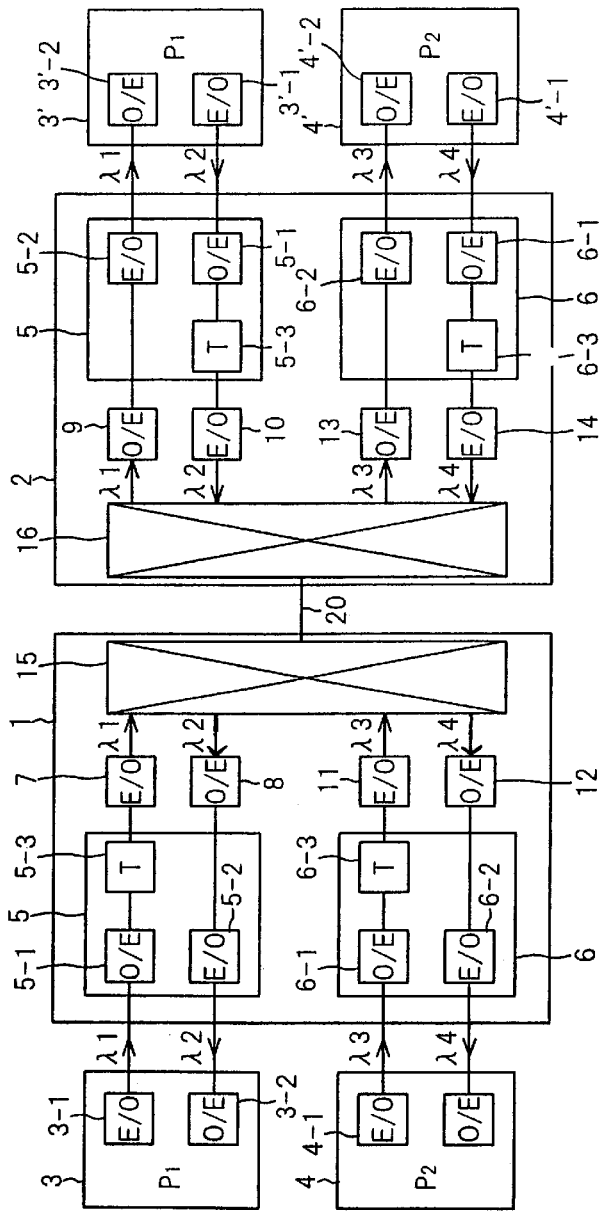
FIG. 1 is a block diagram showing a conventional WDM optical transmission system.

In this WDM optical transmission system, communication between the optical transmission apparatus 3 and 4 and the optical transmission apparatus 3' and 4' is performed in the same way as the WDM optical transmission system in FIG. 1. However, when an optical signal of wavelength λ1 sent from the optical transmission apparatus 3 is transmitted via the WDM optical transmission apparatus 1 and an optical fiber 20 to the WDM optical transmission apparatus 2, the optical signal is demultiplexed by the optical multiplexer-demultiplexer 16 and converted into an electrical signal by the optical to electrical converter 9 and thereafter the pulse width distortion is corrected by the retiming unit 18, the structure and operation being different from those in FIG. 1. Likewise, optical signals of wavelength λ2, λ3 and λ4 are transmitted via the optical fiber 20 as a wavelength division multiplexed signal, and demultiplexed by the optical multiplexer-demultiplexer 15 or 16. The demultiplexed optical signals are converted into electrical signals, and the pulse width distortions thereof are corrected by the corresponding retiming units 18.

As it is obvious from the structure shown in FIG. 2, the retiming units 18 are positioned respectively at the front stage of the optical signal supplying units 5-2 and 6-2 of the optical transceivers 5 and 6, so that the pulse width distortions of the optical signal generated in transmission through the optical fiber 20 between the WDM optical transmission apparatus 1 and 2 are corrected, so that compression of the jitters is effected.

To the outputs of the optical signal receiving units 5-1 and 6-1 of the optical transceivers 5 and 6, the transfer rate detectors 17, which detect the transfer rate of the respective electric signals outputted from the optical signal receiving units 5-1 and 6-1 of the optical transceivers 5 and 6 and supplies the detected results to the retiming units 18, are connected. Accordingly, even if the optical transmission apparatus 3, 4, 3' and 4' are of different transfer rates and different coding formats, optical transceivers 5 and 6 are commonly used.

Figure 3:
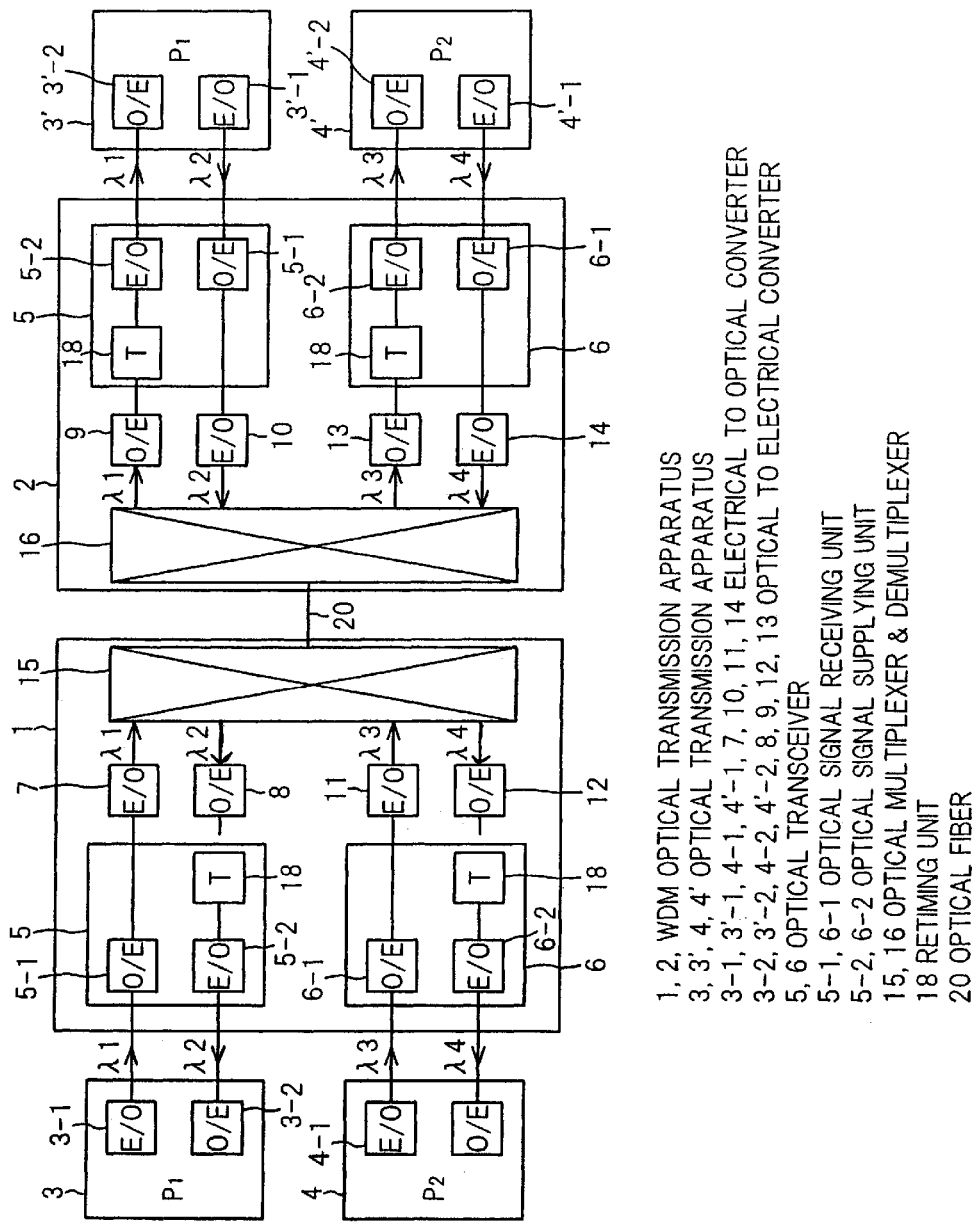
FIG. 3 is a block diagram showing a WDM optical transmission system in a second preferred embodiment according to the invention.

In the above embodiment, the optical transceivers 5 and 6 do not include the retiming unit on the inside thereof, but the retiming unit may be provided, as shown in FIG. 3, within the optical transceivers 5 and 6. In this case, if the transfer rate of the opposite optical transmission apparatus is already known, the transfer rate detector 17 may be omitted, so that a more compact WDM optical transmission apparatus may be realized. In FIG. 3 like parts are indicated by like reference numerals as used in FIG. 2.

As explained hereinbefore, according to a WDM optical transmission system embodying this invention, since a retiming unit is provided at the front stage of the optical signal supplying unit of an optical transceiver which sends an optical signal to any optical transmission apparatus, the pulse width distortion generated in communication through an optical fiber between two WDM transmission apparatus is corrected so that jitter compression is realized. Also, since the transfer rate of the any optical transmission apparatus is detected and the detected result is supplied to the retiming unit, an optical transceiver is commonly used for the any optical transmission apparatus having different transfer rates and coding formats.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A WDM optical transmission system performing communication in accordance with transmission and receipt of an optical wavelength division multiplexed (WDM) signal obtained by multiplexing optical signals of plural wavelengths having same or different transfer rates and coding formats, comprising:

a demultiplexer for demultiplexing a WDM signal to output the optical signals of plural wavelengths, an optical to electrical converter for converting at least one of the optical signals of plural wavelengths into an electrical signal, a retiming unit for correcting pulse width distortion of the electrical signal, and an optical signal supplying unit for converting the electrical signal of which distortion of pulse width has been corrected into an optical signal and then supplying the converted optical to a predetermined optical transmission apparatus, wherein said optical signal supplying unit is included together with an optical signal receiving unit in an optical transceiver, said optical signal receiving unit receiving another optical signal from said predetermined optical transmission apparatus to output another electrical signal, said retiming unit being supplied with a transfer rate of said another electrical signal detected by a transfer rate detector.

2. The WDM optical transmission system as defined in claim 1, wherein:

the optical transceiver is an exclusive transceiver which operates with a transmitting and receiving wavelength corresponding to that of the predetermined optical transmission apparatus.

3. The WDM optical transmission system as defined in claim 1, wherein:

the optical transceiver is designed to be used commonly to plural optical transmission apparatus having different transfer rates and coding formats.

4. The WDM optical transmission system as defined in claim 1, wherein:

the optical transceiver is an exclusive transceiver having a wavelength and a transfer rate corresponding to those of the predetermined optical transmission apparatus.

5. A WDM optical transmission apparatus, comprising:

a demultiplexer for demultiplexing a WDM signal to output optical signals of plural wavelengths;

an optical to electrical converter for converting at least one of the output optical signals of plural wavelengths into an electrical signal;

a retiming unit for correcting pulse width distortion of the electrical signal;

an optical transceiver having (i) an optical signal supplying unit for converting the corrected electrical signal into an optical signal output and (ii) an optical signal receiving unit for receiving another optical signal and converting the other optical signal into another electrical signal; and a transfer rate detector for detecting a transfer rate of the other electrical signal;

wherein the retiming unit is supplied with the detected transfer rate.

6. The apparatus as defined in claim 5, wherein:

the optical transceiver has a predetermined transmitting wavelength and a predetermined receiving wavelength.

7. The apparatus as defined in claim 5, wherein:

the detected transfer rate of the other electrical signal is variable.

* * * * *